ized to the aforesaid planes. # UNITED STATES PATENT OFFICE.

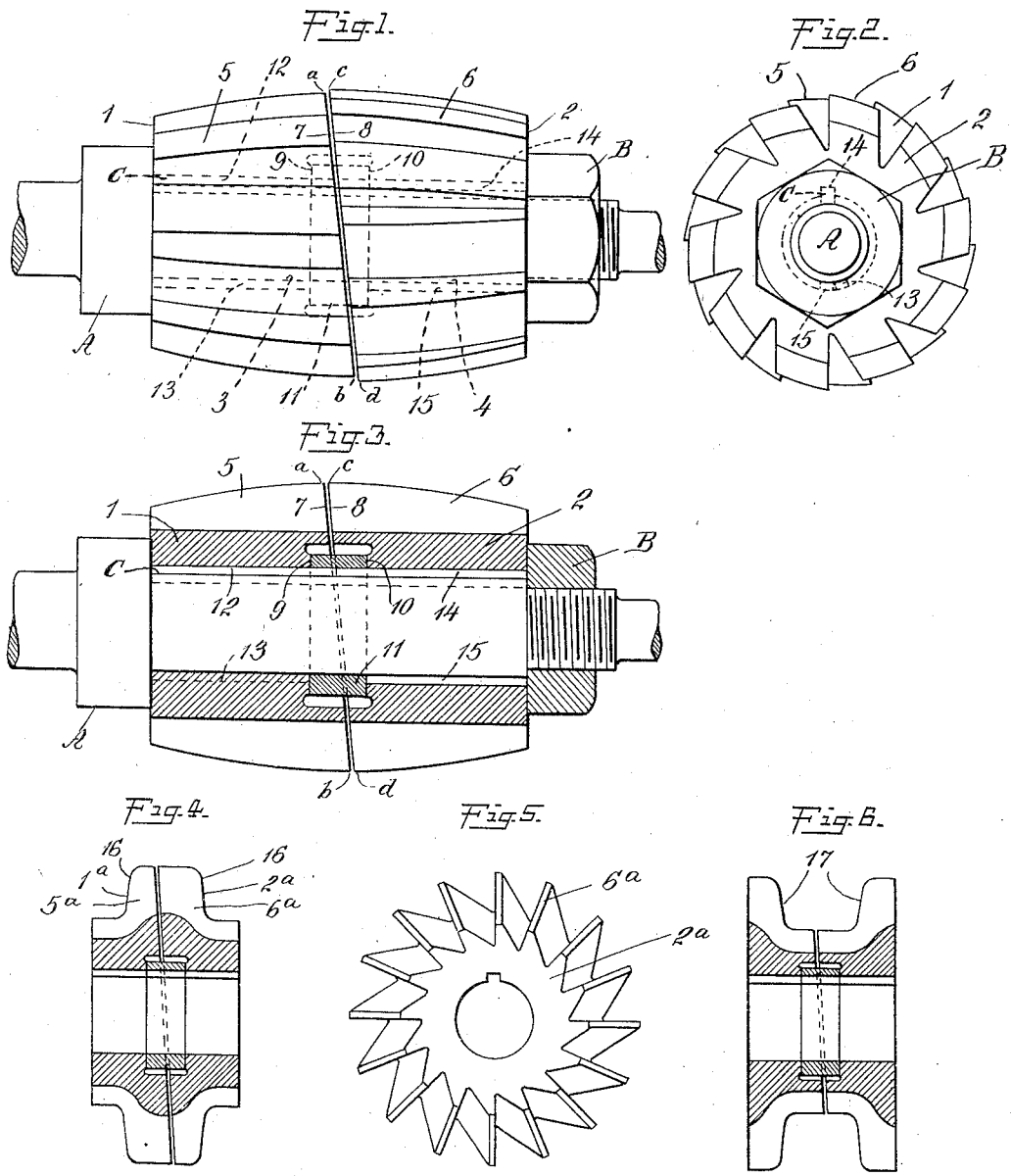

FRANK O. HOAGLAND, OF BRIDGEPORT, CONNECTICUT.

MILLING-CUTTER.

1,326,865.

Specification of Letters Patent.

Patented Dec. 30, 1919.

Application filed September 28, 1918. Serial No. 255,993.

*To all whom it may concern:*

Be it known that I, FRANK O. HOAGLAND, a citizen of the United States, residing at Bridgeport, in the county of Fairfield and State of Connecticut, have invented certain new and useful Improvements in Milling-Cutters, of which the following is a specification.

The invention relates especially to milling cutters which, because of size or for other reasons, are constructed in two parts. The object of the invention is to provide a cheaper and simplified construction of the parts of such a milling cutter and to provide improved means for holding the parts in coöperative relation.

In the accompanying drawing I have shown the embodiment of the invention which I deem preferable, but it will be understood that changes may be made within the scope of the appended claims without departing from the spirit of the invention.

Of the drawing:

Figure 1 is a side view of a cutter embodying the invention.

Fig. 2 is an end view.

Fig. 3 is a longitudinal sectional view.

Figs. 4 and 5 are sectional and end views respectively of a cutter of a different type having a different contour.

Fig. 6 is a view similar to Fig. 5 but showing a cutter with still another contour.

Referring to the drawing, 1 and 2 respectively represent the two parts of a milling cutter. These parts are provided with central alined apertures 3 and 4 which permit the cutter parts to be mounted on a suitable arbor such as A. The cutter parts are held in place on the arbor by means of a nut B. The cutter shown is adapted for cutting a curved contour, but it will be understood that this is immaterial and that the cutter may be constructed for a straight contour or for any irregular contour.

The teeth of the two cutter parts are indicated respectively by 5 and 6, and it will be seen that the teeth 5 of the cutter part 1 at the end adjacent the part 2 terminate at a plane such as *a—b* which is inclined with respect to the cutter axis. Similarly the teeth 6 of the cutter part 2 at the end adjacent the part 1, terminate at a plane such as *c—d* which is inclined with respect to the cutter axis. In this way the cutter is provided with a joint which is at an inclination to the axis. The simplest way of making this joint is to provide the two parts 1 and 2 with adjacent inclined end surfaces such as 7 and 8 which preferably conform respectively to the aforesaid planes *a—b* and *c—d*. When the two parts 1 and 2 of the cutter are assembled, as shown in the drawing, they are adapted to coöperate to effect a smooth cut. The inner ends of the several teeth of the two parts are not in circumferential alinement but are offset so that, when the cutter is turned, no rough or uneven cutting will take place at the joint.

Preferably the two cutter parts are held slightly separated at the surfaces 7 and 8, and for this purpose there are preferably provided annular surfaces 9 and 10 which are near the center and which preferably extend to the openings 3 and 4. These surfaces are parallel to each other and perpendicular to the axis. These two surfaces 9 and 10 may be arranged to contact with each other, but I prefer to provide oppositely formed recesses in the adjacent ends of the cutter parts and to form the surfaces 9 and 10 at the bottoms of the respective recesses. When the surfaces 9 and 10 are so placed, there is provided a washer 11 which is adapted to engage the surfaces and serve as a spacing member. The two parts are held together by the nut B of the arbor A, this nut serving to press the two surfaces 9 and 10 into contact either with each other or with the surfaces of the washer 11. It will be noted that the relation of the two parts is maintained solely by the engagement of the washer 11 with the surfaces 9 and 10. The washer can be accurately formed as can also the surfaces 9 and 10 which are perpendicular to the cutter axis. Inaccuracies may occur in forming the outer inclined surfaces 7 and 8, but any reasonable inaccuracy in these surfaces will be without effect in the operation of the cutter.

In order that the load on the cutter may be more evenly distributed, it is preferable to stagger the teeth of the two parts. This avoids to a large extent the shock and vibration which would occur if the teeth were placed in alinement so that the work would be engaged simultaneously from one end of the cutter to the other. While the staggered arrangement is preferable for cutting, it is desirable that the respective teeth be placed in alinement when the cutter is to be ground.

In Figs. 1 to 3 I have shown a cutter having teeth which are adapted to be ground on their front or radial faces. For grinding such a cutter it is obviously preferable to have the teeth in alinement so that the grinding wheel can be passed from one end of the cutter to the other without interruption. I preferably provide means whereby the two parts of the cutter can be held either with the teeth in staggered relation for cutting or in alined relation for grinding. For this purpose I preferably provide two keyways in each part of the cutter. As illustrated, the keyways in the part 1 are designated by 12 and 13 and the keyways in the part 2 are designated by 14 and 15. The keyways of the two parts have different angular relationships to the other. As shown, the two keyways 14 and 15 are at 180° from each other, whereas the two keyways 12 and 13 are at a little less than 180° from each other. The relationship of the keyways is such that when the two keyways 12 and 14 are in alinement, as shown, the teeth will be held in staggered relation. When the two keyways 13 and 15 are in alinement the teeth will be held in alinement. It will be clear that when the cutter is to be used, it is mounted on the arbor A by means of a key such as C entering the keyways 12 and 14. When the cutter is to be ground it is mounted on an arbor and held in place by means of a key entering the two keyways 13 and 15. Inasmuch as the two surfaces 7 and 8 are slightly separated, as before stated, the two cutter parts can be relatively turned sufficiently to bring the teeth into or out of alinement without causing the surfaces 7 and 8 to interfere with each other.

In Figs. 4 and 5 I have shown a cutter which is in many respects similar to that shown in Figs. 1 to 3, but which differs in that it is provided with teeth adapted to be ground on the outer faces instead of on the radial faces. The cutter has two parts 1ª and 2ª respectively formed with teeth 5ª and 6ª, and the cutter is in other respects similar to that already described. This cutter has a contour which includes oppositely disposed edges 16, 16 sharply inclined with respect to the axis. When the teeth of such a cutter are ground on their outer faces, the edges 16, 16 come closer together, thus destroying the accuracy of the contour. With a cutter embodying my invention the effect of such grinding on the outer faces can be overcome by removing the washer 11 and substituting a washer of greater thickness, or by putting shims of proper thicknesses in place adjacent the washer.

Fig. 6 shows a cutter which is similar to that which is shown in Figs. 4 and 5 except that the contour is different, including two edges 17, 17 which are sharply inclined with respect to the axis and which are at a reentrant angle. It will be seen that there is a tendency when the teeth are ground on their outer faces for the two edges 17, 17 to be moved outward, thus destroying the accuracy of the contour. With a cutter embodying my invention this inaccuracy can be overcome by reducing the thickness of the washer 11, by grinding or otherwise, to restore the edges 17, 17 to the proper relation.

What I claim is:

1. A milling cutter comprising two parts having adjacent surfaces which are at an inclination to the axis and having other adjacent surfaces which are perpendicular to the axis.

2. A milling cutter comprising two parts having adjacent annular surfaces which are near the center and perpendicular to the axis and having other adjacent annular surfaces which are outside the first said surfaces and at an inclination to the axis.

3. A milling cutter comprising two parts having adjacent annular surfaces which are near the center and perpendicular to the axis and having other adjacent annular surfaces which are outside the first said surfaces and at an inclination to the axis, and a washer between the first said surfaces.

4. A milling cutter comprising two parts having adjacent annular surfaces which are near the center and perpendicular to the axis and having other adjacent annular surfaces which are outside the first said surfaces and at an inclination to the axis, and a washer between the first said surfaces, the first said surfaces being so arranged and the washer being of such a thickness that the second said surfaces are held slightly separated.

5. A milling cutter comprising two parts having adjacent surfaces which are approximately plane and at an inclination to the axis, at least one of the said parts having a recess extending below the inclined plane surface thereof, and means entering the said recess for holding the aforesaid inclined plane surfaces slightly separated.

6. A milling cutter comprising two parts having oppositely formed recesses in their adjacent ends and having the adjacent end surfaces outside of the recess at an angle to the axis, and a washer entering the said recesses and serving to hold the inclined surfaces slightly separated.

7. A milling cutter comprising two parts having oppositely formed recesses in their adjacent ends with annular surfaces at the bottoms of the recesses which are perpendicular to the axis and having the adjacent end surfaces outside the recesses at an inclination to the axis, and a washer between the first said surfaces.

8. A milling cutter comprising two parts having adjacent surfaces which are at an inclination to the axis and slightly separated, the said parts being provided with positively acting means whereby the teeth of the respective parts may be held staggered for cutting or in alinement for grinding.

9. A milling cutter comprising two parts having adjacent surfaces which are at an inclination to the axis and slightly separated, each of the said parts being provided with two keyways so arranged that when those of one set are in alinement the teeth of the respective parts will be held staggered and that when those of the other set are in alinement the said teeth will be held in alinement.

10. A milling cutter comprising two parts having adjacent annular surfaces which are near the center and perpendicular to the axis and having other adjacent annular surfaces which are outside the first said surfaces and at an inclination to the axis, the said parts being provided with positively acting means whereby the teeth of the respective parts may be held staggered for cutting or in alinement for grinding.

11. A milling cutter comprising two parts having adjacent annular surfaces which are near the center and perpendicular to the axis and having other adjacent annular surfaces which are outside the first said surfaces and at an inclination to the axis, the said parts being provided with positively acting means whereby the teeth of the respective parts may be held staggered for cutting or in alinement for grinding, and a washer between the first said surfaces, the first said surfaces being so arranged and the washer being of such a thickness that the second said surfaces are held slightly separated.

In testimony whereof I hereto affix my signature.

FRANK O. HOAGLAND.